United States Patent
Barak et al.

(10) Patent No.: US 9,158,556 B2
(45) Date of Patent: Oct. 13, 2015

(54) MANAGING WEB CONTENT CREATION IN A WEB PORTAL

(75) Inventors: Nimrod Barak, Tel Aviv (IL); Eyal Nathan, Reut (IL)

(73) Assignee: SAP Portals Israel Ltd, Ra'anana (IL)

( * ) Notice: Subject to any disclaimer, the term of this patent is extended or adjusted under 35 U.S.C. 154(b) by 306 days.

(21) Appl. No.: 13/450,808

(22) Filed: Apr. 19, 2012

(65) Prior Publication Data

US 2013/0283146 A1 Oct. 24, 2013

(51) Int. Cl.
- *G06F 17/00* (2006.01)
- *G06F 9/44* (2006.01)
- *G06F 17/30* (2006.01)
- *G06F 9/445* (2006.01)

(52) U.S. Cl.
CPC .......... *G06F 9/4443* (2013.01); *G06F 17/3089* (2013.01); *G06F 8/10* (2013.01); *G06F 9/44505* (2013.01)

(58) Field of Classification Search
CPC ............ G06F 8/34; G06F 8/38; G06F 9/4443
See application file for complete search history.

(56) References Cited

U.S. PATENT DOCUMENTS

| | | | |
|---|---|---|---|
| 7,870,512 B2 * | 1/2011 | Misovski | 715/861 |
| 2001/0011366 A1 * | 8/2001 | Beck et al. | 717/1 |
| 2007/0250395 A1 * | 10/2007 | Ghafari | 705/26 |
| 2009/0006987 A1 * | 1/2009 | Simhi et al. | 715/762 |
| 2009/0300146 A1 * | 12/2009 | Park et al. | 709/219 |
| 2010/0325161 A1 * | 12/2010 | Rutter et al. | 707/783 |

* cited by examiner

*Primary Examiner* — Keith Bloomquist
(74) *Attorney, Agent, or Firm* — Fish & Richardson P.C.

(57) ABSTRACT

Techniques for managing web content creation include identifying a portal meta-model comprising one or more rules defining relationships between portal objects, and characteristics of the portal objects; receiving a portal model through a graphical user interface (GUI), the portal model comprising one or more customizable constraints on the relationships between the portal objects and the characteristics of the portal objects; identifying one or more portal objects comprising portal content; and applying the one or more rules and the one or more customizable constraints to the identified one or more portal objects.

21 Claims, 6 Drawing Sheets

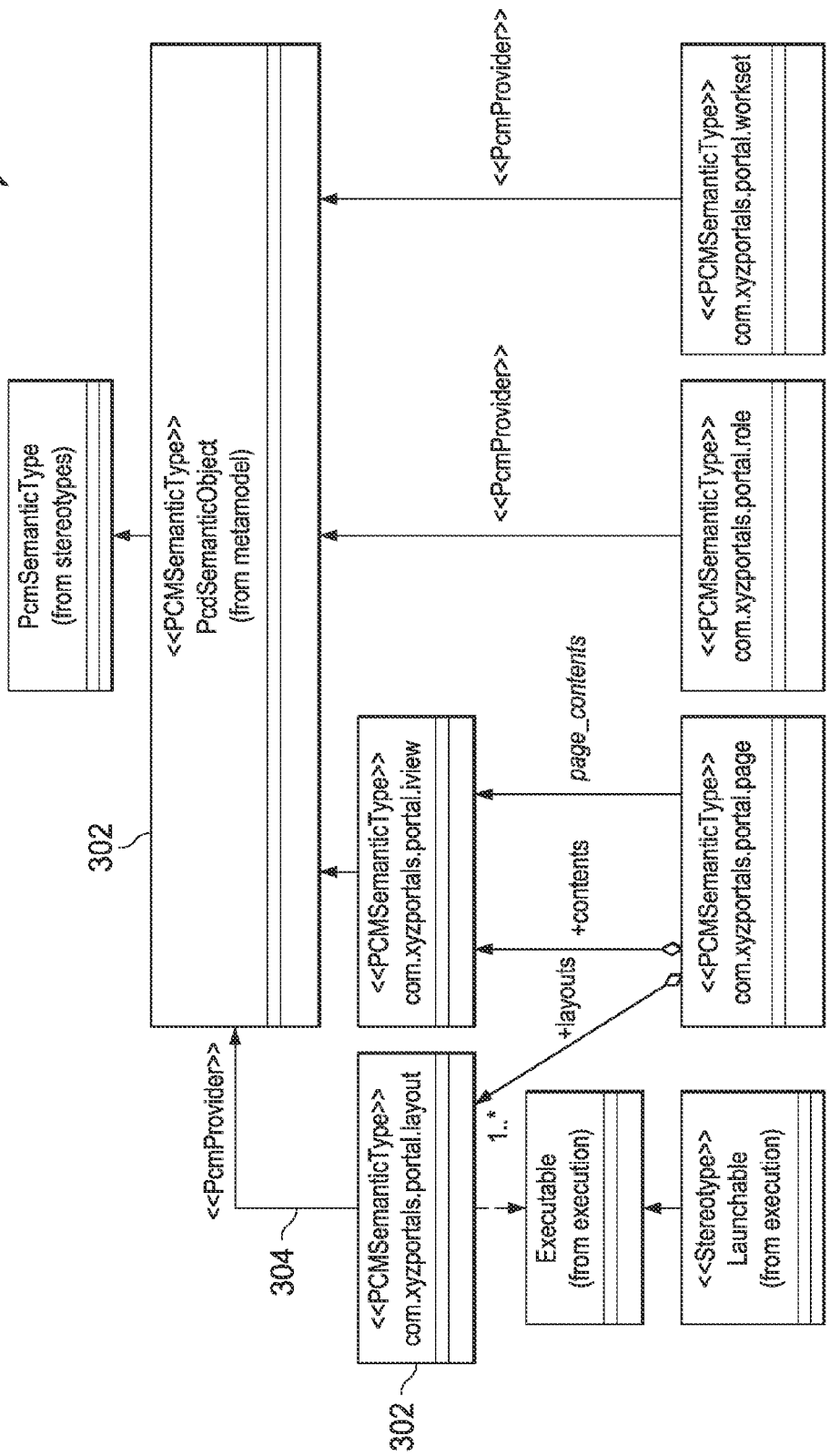

MANAGING WEB CONTENT CREATION IN A WEB PORTAL

TECHNICAL BACKGROUND

This disclosure relates to managing web content creation in a web portal and, more particularly, managing web content creation in a web portal with a meta-model.

BACKGROUND

Content administrators (or developers) can create content structures that end-users can view and/or interact with in a hosted environment, such as a web portal. Such administrators may also be responsible for applying relevant permissions to such content created within the content structures (e.g., portal objects). There may be many (e.g., tens, hundreds, or more) of different available content structure objects, and proper knowledge of such objects may be necessary in order to properly create content in the portal. Content administrators can easily create content errors, which would eventually appear on the test systems and can cause possible delays with projects processes. Proper governance tools and mechanisms may help ensure proper content is maintained according to content structure guidelines.

SUMMARY

This disclosure describes systems, methods, apparatus, and computer-readable media for managing web content creation. In some embodiments, a portal meta-model is identified and can include rules that define relationships between portal objects and that define characteristics of the portal objects. In some examples, the relationships can include containment rules (e.g., which portal objects can be contained (included) by another portal object) and/or portal structure rules (e.g., that a portal role object contains (includes) portal pages). In some examples, the characteristics can include portal assignment rules (e.g., associations between portal role objects and portal user objects). A portal model includes customizable constraints on the relationships between the portal objects and the characteristics of the portal objects. In some examples, the customizable constraints can include portal page rules (e.g., a minimum or maximum number of portal pages contained (included) by the portal role object). Portal objects that include portal content are identified (e.g., portal objects that are created). The rules (of the portal meta-model) and the customizable constraints (of the portal model) are applied to the identified portal objects (that include the portal content).

A general embodiment of the subject described in this disclosure can be implemented in methods that include identifying a portal meta-model including one or more rules defining relationships between portal objects, and characteristics of the portal objects; receiving a portal model through a graphical user interface (GUI), the portal model including one or more customizable constraints on the relationships between the portal objects and the characteristics of the portal objects; identifying one or more portal objects including portal content; and applying the one or more rules and the one or more customizable constraints to the identified one or more portal objects.

Other general embodiments include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

A first aspect combinable with any of the general embodiments includes determining a difference between at least one characteristic of a particular identified portal object and at least one of the rules or the customizable constraints.

A second aspect combinable with any of the previous aspects includes preparing a notification of the determined difference for display through the GUI.

A third aspect combinable with any of the previous aspects further includes initiating a block of publication of the portal content to a web portal based on the identified difference.

A fourth aspect combinable with any of the previous aspects further includes identifying a particular one of the rules or customizable constraints that is different from the at least one characteristic of the particular identified portal object.

A fifth aspect combinable with any of the previous aspects further includes adjusting the notification of the determined difference for display through the GUI.

A sixth aspect combinable with any of the previous aspects further includes identifying one or more portal objects including portal content includes receiving an identification of the one or more portal objects through a portal editor or wizard.

A seventh aspect combinable with any of the previous aspects further includes wherein at least one of the customizable constraints modifies one of the one or more rules defining relationships between the portal objects, and characteristics of the portal objects.

In an eight aspect combinable with any of the previous aspects, a particular one of the one or more rules includes a portal structure rule that defines that a portal object contains one or more portal pages, and a particular one of the customizable constraints defines a maximum number of portal pages contained in the portal role object.

A ninth aspect combinable with any of the previous aspects further includes wherein the portal model includes a user-defined portal model A tenth aspect combinable with any of the previous aspects further includes receiving a modification to the user-defined portal model through the GUI, the modification including a change to at least one of the customizable constraints.

Various embodiments of a content creation module according to the present disclosure may have one or more of the following features. For example, the content creation module facilitates enforcement of rules and constraints provided by a portal meta-model and a portal model. Additionally, such an approach would allow customers to extend the portal meta-model and model definitions (e.g., via the portal model) to allow customization of such rules based on the needs of the customer. Furthermore, time spent on correcting errors in view of the rules and the constraints would be minimized, thus a lower total cost of ownership (TCO). Additionally, a consistency in enforcement of the rules and constraints would be provided, thus all content created across an organization would be based on similar guidelines.

These general and specific aspects may be implemented using a device, system or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and drawings, and from the claims.

DESCRIPTION OF DRAWINGS

FIG. 3 illustrates an example portal meta-model;

DETAILED DESCRIPTION

This disclosure describes systems, methods, apparatus, and computer-readable media for managing web content creation. In some embodiments, a portal meta-model is identified. The portal meta-model can include rules that define relationships between portal objects and that define characteristics of the portal objects. In some examples, the relationships can include containment rules (e.g., which portal objects can be contained (included) by another portal object) and/or portal structure rules (e.g., that a portal role object contains (includes) portal pages). In some examples, the characteristics can include portal assignment rules (e.g., associations between portal role objects and portal user objects). A portal model is received through a graphical user interface (GUI). The portal model includes customizable constraints on the relationships between the portal objects and the characteristics of the portal objects. In some examples, the customizable constraints can include portal page rules (e.g., a minimum or maximum number of portal pages contained (included) by the portal role object). Portal objects that include portal content are identified (e.g., portal objects that are created). The rules (of the portal meta-model) and the customizable constraints (of the portal model) are applied to the identified portal objects (that include the portal content). In some examples, applying the rules and the customizable constraints to the identified portal objects includes determining a difference between the characteristic of the identified portal object and the rules (of the portal meta-model) and/or the customizable constraints (of the portal model), and notifying a user of the difference through the GUI and/or blocking publication of the identified portal object (or portal content of the portal object).

Figure 1:
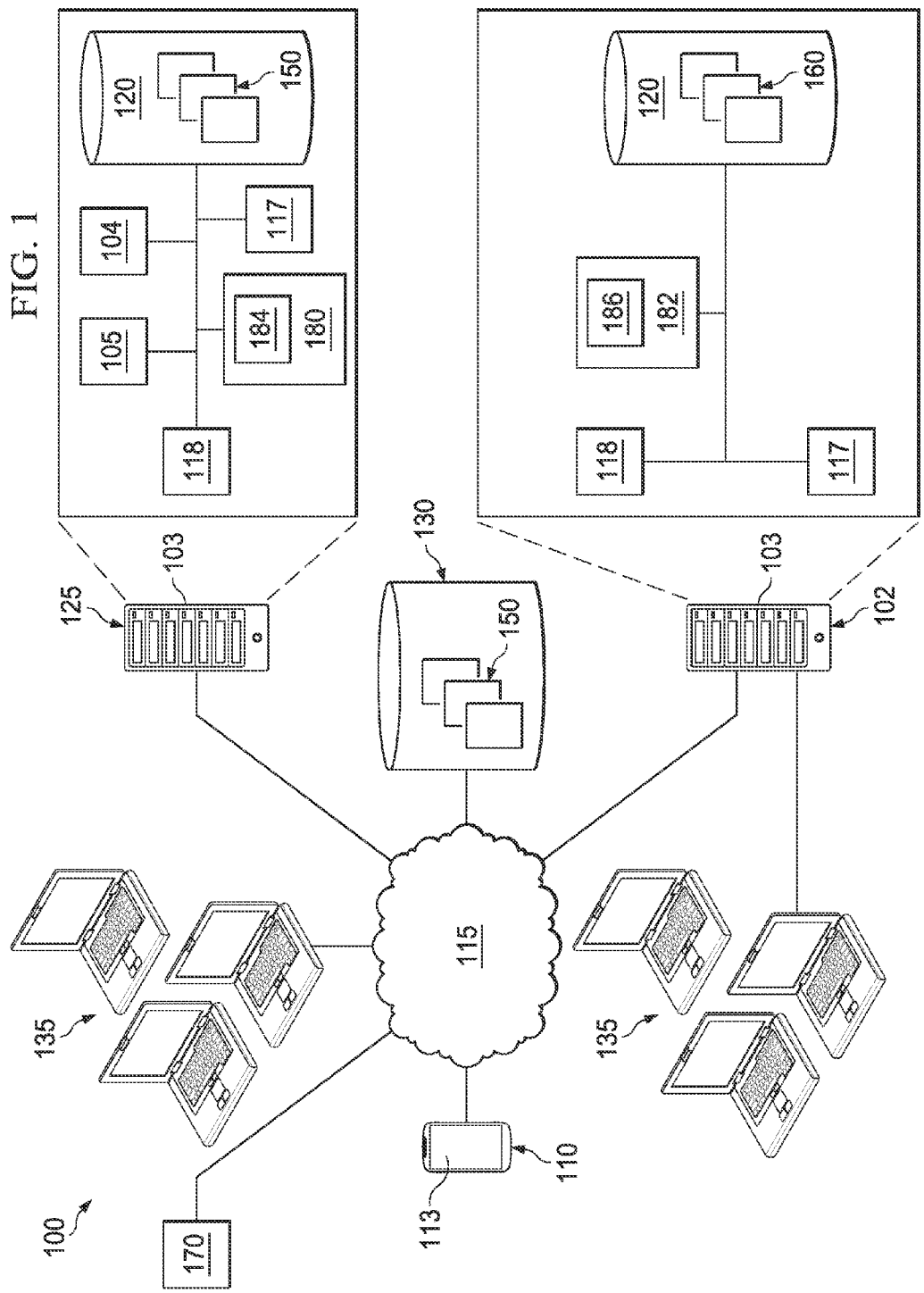
FIG. 1 illustrates an example distributed computing system operable to manage content to be created for a web portal.

FIG. 1 illustrates an example distributed computing system 100 operable to manage creation of web content. For example, the illustrated environment 100 includes or is communicably coupled with an enterprise computing system 102, a mobile communications device 110 ("mobile device"), a host computing system 125, a repository 130, one or more client computing devices 135 ("clients"), and a third party content provider 170, at least some of which communicate across a network 115.

The illustrated enterprise computing system 102 and the illustrated host computing system 125 both include separate servers 103. In general, each server 103 stores one or more hosted applications, such as, for example, a content creation module 104 or a web content composer module 105, where at least a portion of the hosted applications are executed via requests and responses sent to users or clients within and communicably coupled to the illustrated environment 100 of FIG. 1. In some instances, the server 103 may store multiple various hosted applications, while in other instances, the server 103 may be a dedicated server meant to store and execute only a single hosted application (e.g., content creation module 104). In some instances, the server 103 may include a web server, where the hosted applications represent one or more web-based applications accessed and executed via network by the mobile device 110, the clients 135, or both to perform the programmed tasks or operations of the hosted application.

At a high level, each illustrated server 103 includes an electronic computing device operable to receive, transmit, process, store, or manage data and information associated with the environment 100. For example, one or both of the servers 103 illustrated in FIG. 1 may be responsible for receiving application requests from one or more client applications associated with the mobile device 110, the clients 135 or both of the environment 100 and responding to the received requests by processing said requests in an associated hosted application, and sending the appropriate response from the hosted application back to the requesting client application. In addition to requests from the mobile device 110, the clients 135, or both, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates single servers 103 for each of the enterprise computing system 102 and host computing system 125, environment 100 can be implemented using two or more servers 103 for each computing system (102 and 125), as well as computers other than servers, including a server pool. Indeed, server 103 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 103 may be adapted to execute any operating system, including Linux, UNIX, Windows, Mac OS, or any other suitable operating system.

The server 103 of the enterprise computing system 102 includes content creation module 104. The content creation module 104 manages web content creation by applying rules of a portal meta-model and customizable constraints of a portal model to created portal objects. A difference can be determined between the rules and/or the constraints and the portal objects such that a user can be notified of such a difference and/or a publication of the portal object can be blocked. The content creation module 104 can be implemented by and stored by any combination of the enterprise computing system 102, the host computing system 125, the repository 130, the clients 135, and the mobile device 110.

The server 103 of the host computing system 125 includes a web content composer 105. The web content composer 105 composes (creates) and/or edits the portal objects and the portal content that are to be managed by the content creation module 104. In some examples, the web content composer 105 is a "what you see is what you get" (WYSIWYG) web content editor (such as HTML, XML, CSS, or Javascript).

Each of the illustrated servers 103 also includes an interface 117, a processor 118, and a memory 120. The interface 117 is used by the server 103 for communicating with other systems in a distributed environment—including within the environment 100—connected to the network 115; for example, the clients 135, the mobile device 110, or both, as well as other systems communicably coupled to the network 115. Generally, each interface 117 includes logic encoded in software and/or hardware in a suitable combination and operable to communicate with the network 115. More specifically, each interface 117 may include software supporting one or more communication protocols associated with communications such that the network 115 or interface's hardware is operable to communicate physical signals within and outside of the illustrated environment 100.

As illustrated in FIG. 1, each of the servers 103 includes a processor 118. Although illustrated as a single processor 118 in FIG. 1, two or more processors may be used according to particular needs, desires, or particular embodiments of the environment 100. Each processor 118 may be a central processing unit (CPU), a blade, an application specific integrated circuit (ASIC), a field-programmable gate array (FPGA), or another suitable component. Generally, the processor 118 executes instructions and manipulates data to perform the operations of the server 103. For example, the processor 118 executes the functionality required to receive and respond to requests from the clients 135 and/or the mobile device 110.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

Each of the servers 103 also includes a memory 120, or multiple memories 120. The memory 120 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the computing system 102, 125. Additionally, the memory 120 may include any other appropriate data, such as VPN applications, firmware logs and policies, firewall policies, a security or access log, print or other reporting files, as well as others.

The environment further includes an illustrated repository 130. In some embodiments, the repository 130 is an in-memory repository. The repository 130 can be a cloud-based storage medium. For example, the repository 130 can be networked online storage where data is stored on virtualized pools of storage.

The illustrated environment of FIG. 1 also includes one or more clients 135 and the mobile device 110, or multiple mobile devices 110. Each client 135 and/or the mobile device 110 may be any computing device operable to connect to or communicate with at least the computing systems 102, 125 and/or via the network 115 using a wireline or wireless connection. In general, each client 135 and/or the mobile device 110 includes an electronic computer device operable to receive, transmit, process, and store any appropriate data associated with the environment 100 of FIG. 1.

There may be any number of clients 135 and/or mobile devices 110 associated with, or external to, the environment 100. For example, while the illustrated environment 100 includes six clients 135 and one mobile device 110, alternative implementations of environment 100 may include a single client 135 or multiple mobile devices 110 communicably coupled to the server 102 and/or the network 115, or any other number suitable to the purposes of the environment 100.

Additionally, there may also be one or more additional clients 135 and/or mobile devices 110 external to the illustrated portion of environment 100 that are capable of interacting with the environment 100 via the network 115. Further, the term "client" and "user" may be used interchangeably as appropriate without departing from the scope of this disclosure. Moreover, while each client 135 and/or the mobile device 110 is described in terms of being used by a single user, this disclosure contemplates that many users may use one computer, or that one user may use multiple computers. As used in this disclosure, the client 135 is intended to encompass a personal computer, tablet computer, smart phone, cell phone, personal digital assistant (PDA), touch screen terminal, workstation, network computer, kiosk, one or more processors within these or other devices, or any other suitable processing device.

The illustrated mobile device 110 may be any mobile computing device such as a wireless data port, smart phone, personal data assistant (PDA), tablet computing device, one or more processors within these devices, or any other suitable processing device. For example, each client 135 and the mobile device 110 may include a computer that includes an input device, such as a keypad, touch screen, mouse (in the client 135 example), or other device that can accept user information, and an output device that conveys information associated with the operation of the computing systems 102, 125 or the client 135 or the mobile device 100 itself, including digital data, visual information, or a graphic user interface (GUI) 113, as shown with respect to the mobile device 110. In the example of the clients 135, both the input and output device may include fixed or removable storage media such as a magnetic storage media, CD-ROM, or other suitable media to both receive input from and provide output to users of the clients 135 through the display.

Further, the mobile device 110 includes the GUI 113 to interface with at least a portion of the environment 100 for any suitable purpose, including generating a visual representation of a web browser. Generally, through the GUI 113, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 113 can represent any graphical user interface, including but not limited to, a web browser, touch screen, or command line interface (CLI) that processes information in the environment 100 and efficiently presents the information results to the user. In general, the GUI 113 may include multiple user interface (UI) elements, some or all associated with a web browser, such as interactive fields, pull-down lists, and buttons operable by the user at the mobile device 113. These and other UI elements may be related to or represent the functions of the web browser. In particular, the GUI 113 may be used to view and navigate various web pages located both internal and external to the server.

In some embodiments, one or more of the mobile device 110 (or mobile devices 110) and clients 135 may access one or more applications hosted on the host computing system 125 through a portal such as an enterprise portal, also known as an enterprise information portal (EIP) or corporate portal. The web portal (e.g., portal 204 illustrated in FIG. 2) may be a framework for integrating information, people and processes across organizational boundaries. It provides a secure unified access point, often in the form of a web-based user interface, and is designed to aggregate and personalize information through application-specific portlets. For example, the web portal may exhibit de-centralized content contribution and content management, which keeps the information always updated. With only a web browser, users can begin work once they have been authenticated in the portal which offers a single point of access to information, enterprise applications, and services both inside and outside an organization. Enterprise portals may present information from diverse sources in a unified way, and provide additional services, such as an internal search engine, e-mail, news, and various other features. Enterprise portals are often used by enterprises for providing their employees, customers, and possibly additional users with a consistent look and feel, and access control and procedures for multiple applications, which otherwise would have been separate entities altogether.

The environment 100 further includes web (portal) content 150 and portal objects 160. The illustrated web content 150 is the textual, visual or aural content that is encountered as part of the user experience on websites. The web content 160 may include, among other things: text, images, sounds, videos, applications, sub-applications, and animations. The web content 150 is stored by any combination of the host computing system 125 and the repository 130.

In some embodiments, the illustrated portal objects 160 are sub-portions of the web (portal) content 150. The portal objects 160 are any kind of application, information, or service that can be visualized in a Web browser frame. The portal objects 160, in some embodiments, may be self-contained Web documents that are provided via a Uniform Resource Locator (URL) that are managed by the enterprise computing system 102. For example, the portal objects 160 can include alerts, reports, emails, calendars, text documents, multimedia files, reports, files, applications, and other content. For example, if a user enters a word in a dictionary portal object 160, the definition appears inside the area of the portal object 160. A link to usage examples, similar words, etc. can also be provided.

The portal objects 160 can include one or more of the characteristics of: stateless (not permanently connected to any component of the environment 100); embedded (non-dominant, parallel to other portal objects 160); provide previews on underlying processes and/or data; one-screen interactions; include only key functionality; provide direct access without navigation; push information and refresh periodically; integration with third-party software; and allow users to modify an appearance thereof. The portal objects 160 may provide data, for example, providing active information; monitor business processes; preview data and processes; display notifications for starting task-related processes; and offering access to often used data. The portal objects 160 may further provide direct access to simple applications; accelerated access to other applications; reduction of information and interaction to the necessary; and drag-and-relate that use outputs as inputs within the environment 100. The portal objects 160 offer customization such that specific portal objects 160, along with reduction of information and tailoring of information presented by the portal objects 160, can be implemented according to the user data of the user of the mobile device 110, the clients 135, or both.

As illustrated, the portal objects 160 are stored by the memory 120 of the enterprise computing system 102. However, the portal objects 160 can be stored in any combination of the memory the enterprise computing system 102, the host computing system 125, and/or the repository 130. In some embodiments, the portal objects 160 can be provided by and stored by the third party content provider 170.

The environment 100 further includes a portal meta-model 180 and a portal model 182. The portal meta-model 180 includes rules 184 and the portal model 182 includes customizable constraints 186. In summary, the content creation module 104 employs (e.g., applies) the portal meta-model 180 and the portal model 182 to the portal objects 160 when managing the portal objects 160 (e.g., portal objects 160 created by a user or edited/modified by the user, such as a user of the mobile device 110, the clients 135, or both). For example, during generation (or modification) of the portal objects 160 by an administrator (e.g., an IT administrator or portal object developer), the administrator (e.g., the user) of the portal object objects 160 can be confined (e.g., limited) to the rules 184 of the portal meta-model 180 and the customizable constraints 186 of the portal model 182. Thus, the administrator is unable to violate the rules 184 or the customizable constraints 186 (in some examples, without knowledge/awareness of application of the rules 184 or the customizable constraints 186 to the portal objects 160).

In some embodiments, the portal meta-model 180 is provided by the host computing system 125. However, the portal meta-model 180 can be provided by any combination of the host computing system 125, the enterprise computing system 102, the clients 135, or the mobile device 110. The portal meta-model 180 includes (or provides) the rules 184 that define relationships between the portal objects 160 and that define characteristics of the portal objects 160, described further below. In some examples, the portal meta-model 180 provides the rules 184 that are relevant to multiple (or all) portals (e.g., the portal 204 illustrated in FIG. 2). In other words, the portal meta-model 180 and the rules 184 can be common to multiple portals. In some examples, the portal meta-model 180 (and the rules 184) are independent of the specific organization associated with the portal, independent of a group within the organization, independent of a specific person within the organization, or a combination thereof.

In some embodiments, the portal model 182 is provided by the enterprise computing system 102. However, the portal meta-model 182 can be provided by any combination of the host computing system 125, the enterprise computing system 102, the clients 135, or the mobile device 110. The portal model 182 includes (or provides) the customizable constraints 186 on the relationships between the portal objects 160 and the characteristics of the portal object 160. In some examples, the portal model 182 is a specific implementation (or example) of the portal meta-model 180 in that the customizable constraints 186 further define (or limit) the rules 184. In some examples, the portal model 182 provides the customizable constraints 186 that are relevant to only to a subset (or one) portal (e.g., the portal 204 illustrated in FIG. 2). In other words, the portal model 182 and the customizable constraints 186 are specific to one portal (e.g., provided by the organization associated with the portal). In some examples, the portal model 182 (and the customizable constraints 186) are dependent on the specific organization associated with the portal, dependent on a group within the organization, dependent on a specific person within the organization, or a combination thereof.

With respect to the network 115, generally, the network 115 facilitates wireless or wireline communications between the components of the environment 100 (i.e., between the computing systems 102, 125 and the clients 135), as well as with any other local or remote computer, such as additional clients, servers, or other devices communicably coupled to network 115 but not illustrated in FIG. 1. The network 115 is illustrated as a single network in FIG. 1, but may be a continuous or discontinuous network without departing from the scope of this disclosure, so long as at least a portion of the network 115 may facilitate communications between senders and recipients. The network 115 may be all or a portion of an enterprise or secured network, while in another instance at least a portion of the network 115 may represent a connection to the Internet.

In some instances, a portion of the network 115 may be a virtual private network (VPN), such as, for example, the connection between the client 135 and the computing systems 102, 125. Further, all or a portion of the network 115 can include either a wireline or wireless link. Example wireless links may include 802.11a/b/g/n, 802.20, WiMax, and/or any other appropriate wireless link. In other words, the network 115 encompasses any internal or external network, networks, sub-network, or combination thereof operable to facilitate communications between various computing components inside and outside the illustrated environment 100. The network 115 may communicate, for example, Internet Protocol (IP) packets, Frame Relay frames, Asynchronous Transfer Mode (ATM) cells, voice, video, data, and other suitable information between network addresses. The network 115 may also include one or more local area networks (LANs), radio access networks (RANs), metropolitan area networks (MANs), wide area networks (WANs), all or a portion of the Internet, and/or any other communication system or systems at one or more locations.

Figure 2:
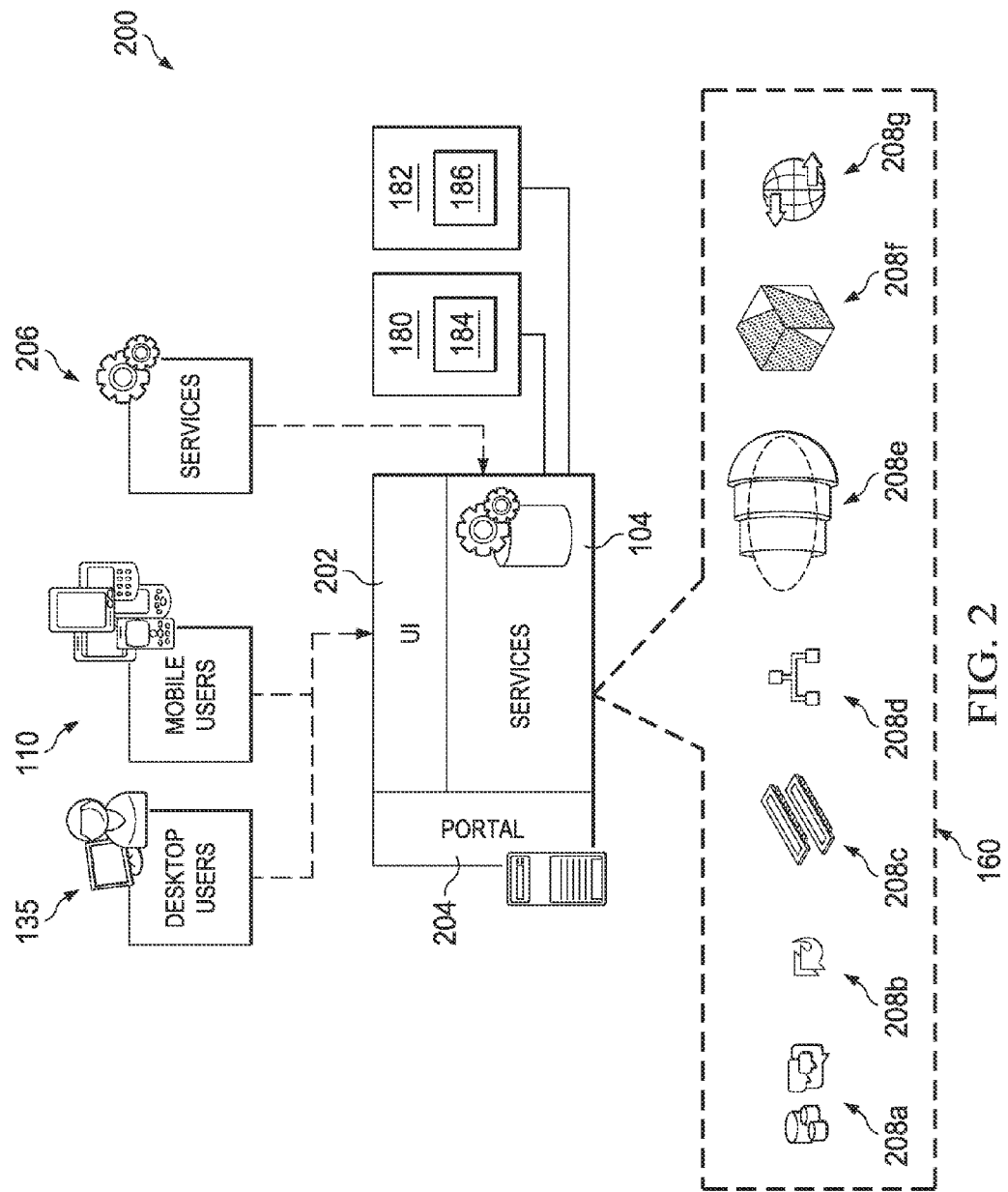
FIG. 2 illustrates an example architecture of a distributed computing system operable to manage content to be created for a web portal.

FIG. 2 illustrates an example environment 200 of a distributed computing system operable to manage creation of the portal objects 160. The environment 200 includes the clients 135, the mobile device 110, the content creation module 104, a graphical user interface (GUI) 202, a portal 204, services 206, content sources 208*a*-208*g*, and the content items 160. The environment 200 further includes the portal meta-model 180 (including the rules 184) and the portal model 182 (including the constraints 186).

The content items 160 are accessed by users of the clients 135, users of the mobile device 110, or users of both ("users") through interaction with the GUI 202. The content items 160 can be stored by, and retrieved from, the one or more content sources 208*a*-208*g*. In the illustrated embodiment, the services 206 may facilitate communication between the content creation module 104 and one or more clients 135 and/or the mobile device 110 outside of the GUI 202. Accordingly, such clients 135 and the mobile device 110 may implement the functionality of the content creation module 104 without accessing the GUI 202 (i.e., without a UI layer), such as, for example, through a query.

Content source 208*a*, for instance, may include a collaboration module that stores, references, and/or accumulates content for sharing and other collaborative actions across multiple systems and/or user (such as across a business enterprise). For example, a collaborative environment or collaboration module in an enterprise environment may share and accumulate information (i.e., content) that enables users to share content and work together in mutual areas in the portal.

Content source 208*b*, for instance, may include an enterprise resource system (ERP) associated with the host computing system 125 that integrates internal and external business and management information across a business enterprise (e.g., finance/accounting, manufacturing, sales and service, and customer relationship management streams of data). The ERP system may facilitate the flow of information between all business functions inside the boundaries of the organization and manage the connections to outside customers and/or clients. The ERP system may include a client/server architecture with one or more databases with modifiable software executing thereon to provide an end-to-end business solution.

Content source 208*c*, for instance, may include content stored, referenced, and/or calculated on an in-memory database associated with the host computing system 125. The in-memory database may include integrated processing, i.e., all business and/or analytic operations done in processing memory. Moreover, content from business content sources may be replicated from one or more transactional systems (e.g., coupled to the network 115) to the in-memory database immediately. Thus, the in-memory database, in some aspects, may handle the analytical systems for all business data in real-time, as opposed to, for instance, computational processing systems that have separate transactional and analytical systems that connect through relational databases (i.e., relational databases stored on magnetic memory that require a process, e.g., ETL, to transfer data from one system to another not in real time but with a delay of an hour, day, week, or longer). In some embodiments, the in-memory database may expose business data and capabilities to improve an end-solution for end users (e.g., the clients 135). The in-memory database may reside on top of a computational engine that facilitates fast manipulations on large amounts of business data and/or replication of entire business suite information. Thus, in some embodiments, the in-memory database may provide for the following design principles/concepts: business data in real-time (e.g., GUI patterns for constantly updated business data); well modeled tables and data cubes (e.g., in order to provide semantic services); a highly parallelized computational engine (e.g., for computationally intensive GUI patterns such as real time alerts and/or suggestions); close coupling of business logic and business data (e.g., eliminating indexing and caching).

Content source 208*d*, for instance, may include a gateway technology associated with the host computing system 125 that provides a simple way to connect devices, environments and platforms based on market standards. For example, the gateway may, for example, be a front-end server to a business suite application and expose business suite services in an open protocol format. Exposed content may include, business and/or social data through social updates, for example, Twitter, Facebook, RSS feed/channels, and/or other feed sources or channels.

Content source 208*e*, for instance, may include a business object repository. Each business object stored in the repository, for example, may include a capsule with an internal hierarchical structure, behavior offered by its operations, and integrity constraints. In general, the overall structure of the business object model ensures the consistency of the interfaces that are derived from the business object model. The derivation helps ensure that the same business-related subject matter or concept can be represented and structured in the same way in various interfaces. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Business objects are generally semantically disjointed, i.e., the same business information is represented once. In some embodiments, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure.

A business object may be defined such that it contains multiple layers. Typical business object may contain four layers: a kernel layer, an integrity layer, an interface layer, and an access layer. The innermost layer of the example business object is the kernel layer. The kernel layer represents the business object's inherent data, containing various attributes of the defined business object. The second layer represents the integrity layer. The integrity layer contains the business logic of the object. Such logic may include business rules for consistent embedding in a computing environment and the constraints regarding the values and domains that apply to the business object. Business logic may include statements that define or constrain some aspect of the business, such that they are intended to assert business structure or to control or influence the behavior of the business entity. It may pertain to the facts recorded on data and constraints on changes to that data. In effect, business logic may determine what data may, or may not, be recorded in business object. The third layer, the interface layer, may supply the valid options for accessing the business object and describe the implementation, structure, and interface of the business object to the outside world. To do so, the interface layer may contain methods, input event controls, and output events. The fourth and outermost layer of the business object is the access layer. The access layer defines the technologies that may be used for external access to the business object's data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects of this embodiment may implement standard object-oriented technologies such as encapsulation, inheritance, and/or polymorphism.

Content source 208f, for instance, may include, a business intelligence module that, at a high level, provides software and/or middleware services for performance analytics (e.g., supports organizational efforts to develop sophisticated visual representations of processes and performance, providing organizations with new insights that can help them make more informed decisions, assess and plan a business intelligence strategy, deploy dashboard tools, generate management and operational reports, and build an IT infrastructure that provides high scalability for users and data); services for analytic applications (e.g., provides guidance and deployment expertise in implementing analytic applications, offering pre-built analytics and data models to help a customer with a specific business problem in various industries, helping organizations to efficiently deploy applications); and introductory business intelligence services (e.g., introduces organizations to the dynamics of using business intelligence, providing the ability to leverage the functionality of business intelligence—such as executive dashboards and operational reports—without initiating a full-scale implementation).

Content source 208f, for instance, may be content from third party platforms, such as content from third parties unaffiliated with, for example, the host computing system 125 and enterprise computing system 102. For instance, content source 208f may be content from third party content provider 170.

To that end, in some examples, the web content creation is managed. Specifically, the portal meta-model 180 is identified. The portal meta-model 180 can include the rules 184 that define relationships between the portal objects 160 and that define characteristics of the portal objects 160. In some examples, the relationships can include containment rules (e.g., which of the portal objects 160 can be contained (included) by another portal object 160) and/or portal structure rules (e.g., rules that stipulate that a portal object 160 contains (includes) portal pages). In some examples, the characteristics can include portal assignment rules (e.g., associations between portal role objects 160 and portal user objects 160). A portal model 182 is received through a graphical user interface (GUI) (such as the GUI 113 of the mobile device 110). The portal model 182 includes customizable constraints 186 on the relationships between the portal objects 160 and the characteristics of the portal objects 160. In some examples, the customizable constraints 186 can include portal page rules (e.g., a minimum or maximum number of portal pages contained (included) by the portal role object 160). The portal objects 160 that include the portal content (e.g., the web content 160) are identified. The rules 184 (of the portal meta-model 180) and the customizable constraints 186 (of the portal model 182) are applied to the identified portal objects 160 (that include the portal content). In some examples, applying the rules 184 and the customizable constraints 186 to the identified portal objects 160 includes determining a difference between the characteristic of the identified portal object 160 and the rules 184 (of the portal meta-model 180) and/or the customizable constraints 186 (of the portal model 182), and notifying a user of the difference through the GUI and/or blocking publication of the identified portal object 160 (and/or portal content of the portal object 160).

Specifically, the portal meta-model 180 is identified. The portal meta-model 180 can include rules 184 that define the relationships between the portal objects 160 and that define the characteristics of the portal objects 160. Identification of the portal meta-model 180 can include receiving the portal meta-model 180 (e.g., from the host computing system 102), retrieving the portal meta-model 180 (e.g., from the host computing system 102), or both. In some embodiments, the portal 204, the content creation module 104, or both, identify the portal meta-model 180.

As mentioned above, the portal meta-model 180 provides the rules 184 that are common to multiple portals (or organizations). However, in some examples, the specific portal meta-model 180, the rules 184, or both, can be based on the content (e.g., the content objects 160) of the portal, a type of the portal (e.g., similar "types" of portals will be common to the portal meta-model 180), or both. In some examples, the rules 184 that define the relationships between the portal objects 160 can include rules relating to containment of one or more of the portal objects 160 by another portal object 160 (e.g., containment rules); rules relating to associations between portal objects 160 (such as associations between portal role objects 160 and user role objects 160). In some examples, the containment rules can types of objects the portal objects 160 can include (such as portal pages), and that the portal pages cannot include a portal object 160. In some examples, the rules 184 that define the characteristics of the portal objects 160 can include assignment of the portal objects 160 to differing user roles (e.g., portal assignment rules).

In some examples, the rules 184 further include a portal structure rule that defines that one or more of the portal objects 160 contains (includes) one or more portal pages. For example, the portal objects 160 relating to a specific portal 204 (and in some examples, a specific organization) contain (include) one or more portal pages. Similar to that mentioned above, the portal pages can include web documents that are provided via a Uniform Resource Locator (URL) that are managed by the enterprise computing system 102. In some examples, each portal object 160 can include one or more portal pages. In some examples, a subset of the portal objects 160 can include one or more portal pages. In some examples, the subset of the portal objects 160 can relate to a specific categorization of the portal objects (e.g., portal objects 160 relating to a certain role of the user, or portal objects 160 relating a specific functionality).

The portal model 182 is received through a graphical user interface (GUI) (such as the GUI 113 of the mobile device 110). The portal model 182 includes the customizable constraints 186 on the relationships between the portal objects 160 and on the characteristics of the portal objects 160. For example, the portal model 182 is received from the enterprise computing system 102. In some examples, the enterprise computing system 102 provides (generates) the portal model 182 (e.g., to the content creation module 104). In some examples, the enterprise computing system 102 provides (generates) the portal model 182 in response to identification of the portal meta-model 180. For example, a portal manager/supervisor can provide (or generate) the portal model 182 based on the portal meta-model 180 such that the portal model 182 is customized (or tailored) to the organization (or group) associated with the portal 204. In some examples, the portal manager/supervisor can be a person, a computer-implemented software module, or a combination of both. In some embodiments, the portal 204, the content creation module 104, or both, receive the portal model 182.

In some embodiments, at least one of the customizable constraints 186 modifies one of the rules 184 (of the portal meta-model 180) that define the relationships between the portal objects 160 and the characteristics of the portal objects 160. In some examples, the customizable constraints 186 are based on the rules 184. Specifically, the customizable constraints 186 can further define (or limit) the rules 184 (such that the rules 184 are customized for the organization (or group) associated with the portal 204). Thus, the customizable constraints 186 on the rules 184 are dependent on the portal 204 (or each subset of portals 204). In other words, the customizable constraints 186 on the rules 184 vary for each associated portal 204. In some examples, the customizable constraints 186 are dependent on the related portal meta-model 180. In some examples, the customizable constraints 186 are dependent on the rules 184 of the related portal meta-model 180.

In some examples, the customizable constraints 186 are on each of the rules 184 of the portal meta-model 180 (e.g., the relationships between the portal objects 160 and the characteristics of the portal objects 160), or a subset of the rules 184. In some examples, the customizable constraints 186 are on none of the rules 184 of the portal meta-model 180 such that essentially the portal model 182 is substantially the same (or similar) to the portal meta-model 180. In some examples, the portal meta-model 180 can offer suggestions for the customizable constraints 186 of the portal model 182. For example, the portal meta-model 180 can offer the suggestions via a drop down menu (such as via the GUI). In some examples the customizable constraints 186 are user defined, such as through an input box (provided via the GUI).

In some examples, the customizable constraints 186 on the relationships between the portal objects 160 and on the characteristics of the portal objects 160 can include constraints on the "look and feel" of the portal objects 160, such as associated names of the portal objects 160. In some examples, the constraints can include restrictions on the types of portal objects 160 (e.g., HTML5 portal objects); restrictions on navigational properties associated with the portal objects 160 (e.g., allowed access to the portal objects 160 by a user); restrictions on a number of portal pages contained by the portal objects 160, including a number of worksets, the number of portal pages contained by the worksets, the types of portal pages contained by the worksets, and the formatting of the portal pages.

In some examples, the customizable constraints 186 further include a constraint on the portal structure rule of the rules 184 (of the portal meta-model 180). Specifically, the customizable constraint 186 on the portal structure rule can define that the maximum (or minimum) number of portal pages contained (included) by the portal objects 160. For example, the portal objects 160 relating to a specific portal 204 (and in some examples, a specific organization) contain (include) a maximum (or minimum) number of portal pages. In some examples, each portal object 160 can include a differing maximum (or minimum) number of portal pages. In some examples, each portal object 160 can include a same maximum (or minimum) number of portal pages. In some examples, a subset of the portal objects 160 include the same maximum (or minimum) number of portal pages. In some examples, the subset of the portal objects 160 can relate to a specific categorization of the portal objects (e.g., portal objects 160 relating to a certain role of the user, or portal objects 160 relating a specific functionality).

In some embodiments, the portal model 182 includes a user-defined portal model 182 such that a modification is received to the user-defined portal model 182 through the GUI (such as the GUI 113). The modification includes a change to at least one of the customizable constraints 186. For example, the user-defined portal model 182 can be based on the portal model 182. The user-defined portal model 182 can include modifications (changes) to the portal model 182, such as modifications to one or more of the customizable constraints 186.

Portal objects 160 including portal content are identified. For example, the portal objects 160 that include web (portal) content 150 are identified. In some examples, identification of the portal objects 160 can include creation (or editing) of the portal objects 160 (such as by a user). In some examples, identification of the portal objects 160 can include identifying created or edited (e.g., recently created or edited) portal objects 160. In some examples, identification of the portal objects 160 can include identifying the portal objects 160 that are associated with the portal 204 (that is associated with an organization). In some examples, only a portion of the portal objects 160 that are associated with the portal 204 include portal content. In some examples, each portal object 160 that is associated with the portal 204 includes portal content. In some examples, the portal content can include the aforementioned portal pages. Thus, the identified portal objects 160 can be associated with one or more portal pages. In some embodiments, the portal 204, the content creation module 104, or both, identify the portal objects 160.

In some embodiments, the portal objects 160 can be identified by receiving an identification of the portal object 160 through a portal editor or (portal) wizard. For example, the portal editor or wizard can be a computer-implemented software module (not shown) that provides an interactive GUI to the user. The user can identify the portal objects 160 (that include the portal content) via the portal editor or wizard. For example, the user can create the portal objects 160 via the portal editor or wizard. In some examples, the user can delete content from the portal objects 160 via the portal editor or wizard. In some examples, the portal editor or wizard further includes a property editor such that a user can set values to the properties of the portal objects 160. In some examples, the portal editor or wizard includes specific editors based on the portal object 160 (and the content of the portal object 160). For example, for a portal page (e.g., the content of the portal object 160), the editor can relate to changing a layout of the portal page.

The rules 184 and the customizable constraints 186 are applied to the identified portal objects 160. Specifically, applying the rules 184 and the customizable constraints 186 includes comparing the relationships between the portal objects 160 and the characteristics of the portal objects 160 to the rules 184 and the customizable constraints 186. Comparing the relationships between the portal objects 160 and the characteristics of the portal objects 160 can include comparing each of the relationships between the portal objects 160 and the characteristics of the portal objects 160 to each of the rules 184 and the customizable constraints 186, or comparing to a subset of the rules 184 and the customizable constraints 186 (e.g., only the rules 184 and the customizable constraints 186 relevant to the specific relationship between the portal objects 160 and the characteristics of the portal objects 160). In some embodiments, the portal 204, the content creation module 104, or both, apply the rules 184 and the customizable constraints 186 to the identified portal objects 160.

In some examples, the rules 184 and the customizable constraints 186 are applied to the identified portal objects 160 as the user is creating (or editing) the identified portal objects 160 (e.g., in "real-time" or dynamically). In some examples, the rules 184 and the customizable constraints 186 are applied to the identified portal objects 160 after the user created (or edited) the identified portal objects 160. In some examples, the rules 184 and the customizable constraints 186 are applied to the identified portal objects 160 in response to a user-initiation to apply the rules 184 and the customizable constraints 186 (e.g., the user selecting (clicking) a computer icon associated with applying the rules 184 and the customizable constraints 186). In some examples, the rules 184 and the customizable constraints 186 are applied separately to the identified portal objects 160. In some examples, the rules 184 are applied to the identified portal objects 160 first, then the customizable constraints 186 are applied to the identified portal object 160. In some examples, the rules 184 and the customizable constraints are applied at the same time to the identified portal objects 160. In some examples, the rules 184 and the customizable constraints 186 are applied automatically during (or after) creation of the identified portal objects 106 (e.g., without the user being aware of application of the rules 184 and the customizable constraints 186).

In some examples, applying the rules 184 and the customizable constraints 186 include applying the portal structure rule of the rules 184 and the constraint 186 on the portal structure rule to the identified portal objects 160. Specifically, applying the portal structure rule to the identified portal objects 160 includes determining whether the one or more (or each) of the identified portal objects 160 include one or more portal pages. Applying the customizable constraint on the portal structure rule can include determining whether the one or more (or each) of the identified portal objects 160 includes a number of portal pages greater than a maximum number (or less than a minimum number).

In some additional embodiments, a difference is determined between characteristics of a particular identified portal object 160 and the rules 184, the customizable constraints 186, or both. For example, based on the comparison between the relationships between the portal objects 160 and the characteristics of the portal objects 160 to the rules 184 and the customizable constraints 186, one or more differences are determined. In some examples, multiple differences are determined between the particular identified portal object 160 and the rules 184, the customizable constraints 186, or both. In some examples, at least one difference is determined between multiple identified portal objects 160 and the rules 184, the customizable constraints 186, or both.

A notification is prepared for display through the GUI based on the determined difference. For example, after comparing the relationships between the portal objects 160 and the characteristics of the portal objects 160 to the rules 184 and the customizable constraints 186, the difference is determined. The determined difference can be presented to the user through the GUI (such as the GUI 113) via the notification. In some examples, the notification can be presented via a pop up display, a notification with an application working environment, or other such notification means. In some embodiments, the portal 204, the content creation module 104, or both, determine the difference and prepare the notification based on the determined difference.

In some additional embodiments, a particular one of the rules 184, the customizable constraints 186, or both, is identified that is different from one or more characteristics of the particular identified portal object 160. For example, based on the determined difference between the characteristics of the particular identified portal object 160 and the rules 184, the customizable constraints 186, or both, the particular rule 184, customizable constraints 186, or both, is identified. Based on the determined difference, the notification can be adjusted for display through the GUI. Specifically, based on the identified rule 184, customizable constraint 186, or both, associated with the determined difference, the notification can be adjusted. The notification can include a description of the difference, and the identified rule 184, customizable contract 186, or both, associated with the difference. In some examples, the notification can further include options for correcting and adjusting the characteristic of the particular identified portal object 160 such that the particular identified portal object 160 is in compliance with the rules 184, the customizable constraints 186, or both. In some embodiments, the portal 204, the content creation module 104, or both, identify the particular rule 184, customizable constraints 186, or both and adjusting the notification accordingly.

In some examples, determining the difference between the characteristics of the portal objects 160 and the rules 184, the customizable constraints 186, or both includes determining the difference between the portal structure rule and the constraints on the portal structure and the characteristics of the portal objects 160. Specifically, for each portal object 160 (or a subset of the portal objects 160), a difference is determined between the number of portal pages contained (included) by the portal object 160 and the maximum number (or minimum number) of portal pages defined by the constraint on the portal structure rule. Furthermore, based on this determined difference, a notification is prepared for display through the GUI. For example, when the difference indicates that the number of portal pages contained (included) by the portal object 160 is greater than the constraint on the portal structure rule, the notification indicates such.

In some additional embodiments, based on the identified difference, a publication of the portal content (and/or the portal object 160) to the (web) portal 204 is blocked. For example, after comparing the relationships between the portal objects 160 and the characteristics of the portal objects 160 to the rules 184 and the customizable constraints 186 and determining a difference based on the comparison, a publication of the portal content (and/or the portal object 160) associated with the determined difference is blocked. In some examples, only portal content associated with a subset of identified differences is blocked from publication. In some examples, only a portion of the portal content associated with the identified difference is blocked from publication. In some examples, when the number of portal pages contained (included) by the portal object 160 is greater than the constraint on the portal structure rule, the publication of the portal content (e.g., the portal pages) or the portal object 160 to the portal 204 is blocked.

FIG. 3 illustrates an example portal meta-model 300. Specifically, the illustrated portal meta-model 300 (similar to the portal meta-model 180) includes entities 302 (e.g., portal meta-model entities) and relationships 304 between the entities 302. The portal meta-model 300 includes definitions between semantic objects (such as the entities 302) and their properties; and further includes definitions of relationships between the semantic objects (such as the entities 302) including containment and inheritance. For example, the illustrated portal meta-model 300 can include a semantic relating to a portal role having a set of properties (including metadata). A type of the entity defined on a property of the entity can include a type named "com.sapportals.portal.role" which defines the title of the role (e.g., "HR managers").

Figure 4A:
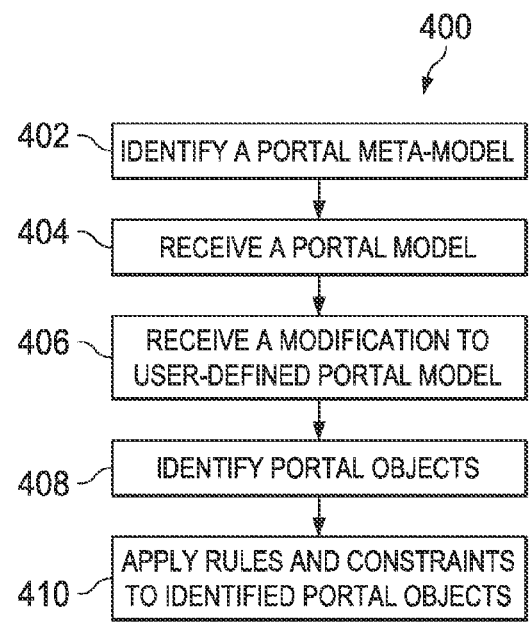
FIGS. 4A-4B illustrate example methods for managing content to be created for a web portal.

FIG. 4A illustrates an example method for managing content to be created for a web portal (e.g., portal 204). The example method 400 can be executed, for example, by the content creation module 104, the portal 204, or both, using one or more computing devices. For example, any combination of the computing systems 102, 125, the clients 135, and the mobile device 110 can be used to execute the example process 500 and obtain any data from the memory of the clients 135, the mobile device 110, the computing systems 102, 125, and/or the repository 130.

In step 402, a portal meta-model is identified including rules defining (a) relationships between portal objects, and (b) characteristics of the portal objects. For example, the content creation module 104, the portal 204, or both identify the portal meta-model 180. The portal meta-model 180 includes the rules 184 that define (a) the relationships between the portal objects 160 and (b) characteristics of the portal objects 160. Identification of the portal meta-model 180 can include receiving the portal meta-model 180 (e.g., from the host computing system 102), retrieving the portal meta-model 180 (e.g., from the host computing system 102), or both. In some embodiments, a particular one of the rules 184 include a portal structure rule 184 that defines that a portal object 160 is to contain one or more portal pages. For example, the portal objects 160 relating to a specific portal 204 (and in some examples, a specific organization) contain (include) one or more portal pages.

In step 404, a portal model is received through a graphical user interface (GUI). The portal model includes customizable constraints on (a) the relationships between the portal objects and (b) the characteristics of the portal objects. For example, the content creation module 104, the portal 204, or both receive the portal model 182 through the GUI (such as the GUI 113). The portal model 182 includes the customizable constraints 186 on (a) the relationships between the portal objects 160 and (b) the characteristics of the portal objects 160. In some examples, the portal model 182 is received from the enterprise computing system 125. In some examples, the enterprise computing system 125 provides (generates) the portal model 182 (e.g., to the content creation module 104). In some examples, the enterprise computing system 125 provides (generates) the portal model 182 in response to identification of the portal meta-model 180.

In some embodiments, at least one of the customizable constraints 186 modifies one of the rules 184 that define (a) the relationships between the portal objects 160, and (b) the characteristics of the portal objects 160. In some examples, the customizable constraints 186 are based on the rules 184. Specifically, the customizable constraints 186 can further define (or limit) the rules 184 (such that the rules 184 are customized for the organization (or group) associated with the portal 204).

In some embodiments, a particular customizable constraint 186 defines a maximum (or minimum) number of portal pages contained (included) in the portal object 160. In some examples, the portal objects 160 relating to a specific portal 204 (and in some examples, a specific organization) contain (include) a maximum (or minimum) number of portal pages.

In step 406, a modification to a user-defined portal model is received through the GUI. The modification includes a change to at least one of the customizable constraints. For example, the content creation module 104, the portal 204, or both, receive the modification to the user-defined portal model 182 through the GUI. The modification includes a change to at least one of the customizable constraints 186. The user-defined portal model 182 can include modifications (changes) to the portal model 182, such as modifications to one or more of the customizable constraints 186.

In step 408, one or more portal objects including portal content is identified. For example, the content creation module 104, the portal 204, or both identify the portal objects 160 that include the portal content (e.g., the web (portal) content 150). Identification of the portal objects 160 can include creation (or editing) of the portal objects 160 (such as by a user). In some examples, identification of the portal objects 160 can include identifying the portal objects 160 that are associated with the portal 204 (that is associated with an organization).

In some embodiments, identification of the one or more portal objects is received through a portal editor or (portal)

wizard. For example, the content creation module 104, the portal 204, or both, receive the identification of the one or more portal objects 160 through the portal editor or (portal) wizard For example, the portal editor or wizard can be a computer-implemented software module (not shown) that provides an interactive GUI to the user. The user can identify (e.g., create or edit) the portal objects 160 (that include the portal content) via the portal editor or wizard.

In step 410, the rules, the customizable constraints, or both, are applied to the identified portal objects. For example, the content creation module 104, the portal 204, or both, apply the rules 184, the customizable constraints 186, or both, to the identified portal objects 160. Applying the rules 184 and the customizable constraints 186 includes comparing the relationships between the portal objects 160 and the characteristics of the portal objects 160 to the rules 184 and the customizable constraints 186.

Figure 4B:
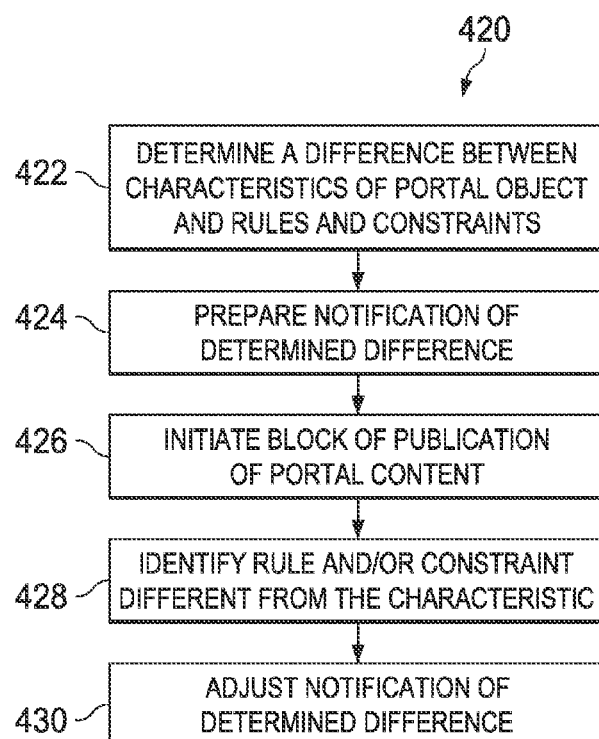

FIG. 4B illustrates an example method for determining differences between created web content and rules and customizable constraints. The example method 420 can be executed, for example, by the content creation module 104, the portal 204, or both, using one or more computing devices. For example, any combination of the computing systems 102, 125, the clients 135, and the mobile device 110 can be used to execute the example process 420 and obtain any data from the memory of the clients 135, the mobile device 110, the computing systems 102, 125, and/or the repository 130.

In step 422, a difference between characteristics of a particular identified portal object and the rules, the customizable constraints, or both is determined. For example, the content creation module 104, the portal 204, or both, determine a difference (or differences) between the particular identified portal object 160 and the rules 184, the customizable constraints 186, or both. In some examples, based on the comparison of the relationships between the portal objects 160 and the characteristics of the portal objects 160 to the rules 184 and the customizable constraints 186, one or more differences are determined.

In step 424, a notification of the determined difference is prepared for display through the GUI. For example, the content creation module 104, the portal 204, or both, prepare for display through the GUI (such as the GUI 113) the notification of the determined difference. In some examples, after comparing the relationships between the portal objects 160 and the characteristics of the portal objects 160 to the rules 184 and the customizable constraints 186, the difference is determined.

In step 426, a block of publication of the portal content to a web portal is initiated based on the identified difference. For example, the content creation module 104, the portal 204, or both, initiate the block of publication of the portal content (e.g., the web (portal) content 150) to the portal 204 based on the identified difference. In some examples, after comparing the relationships between the portal objects 160 and the characteristics of the portal objects 160 to the rules 184 and the customizable constraints 186 and determining a difference based on the comparison, a publication of the portal content (and/or the portal object 160) associated with the determined difference is blocked for publication on (or by) the portal 204.

In step 428, a particular rule, customizable constraint, or both, is identified that is different from the characteristic of the particular identified portal object. For example, the content creation module 104, the portal 204, or both, identified the particular rule 184, the customizable constraint 186, or both, that is different from the characteristics of the particular identified portal object 160. In some examples, based on the determined difference between the characteristics of the particular identified portal object 160 and the rules 184, the customizable constraints 186, or both, the particular rule, customizable constraints 186, or both, is identified.

In step 430, the notification of the determined difference is adjusted for display through the GUI. For example, the content creation module 104, the portal 204, or both, adjust the notification of the determined difference for display through the GUI (such as the GUI 113). The notification can include a description of the difference, and the identified rule 184, customizable contract 186, or both, associated with the difference. In some examples, the notification can further include options for correcting and adjusting the characteristic of the particular identified portal object 160 such that the particular identified portal object 160 is in compliance with the rules 184, the customizable constraints 186, or both.

Figure 5A:
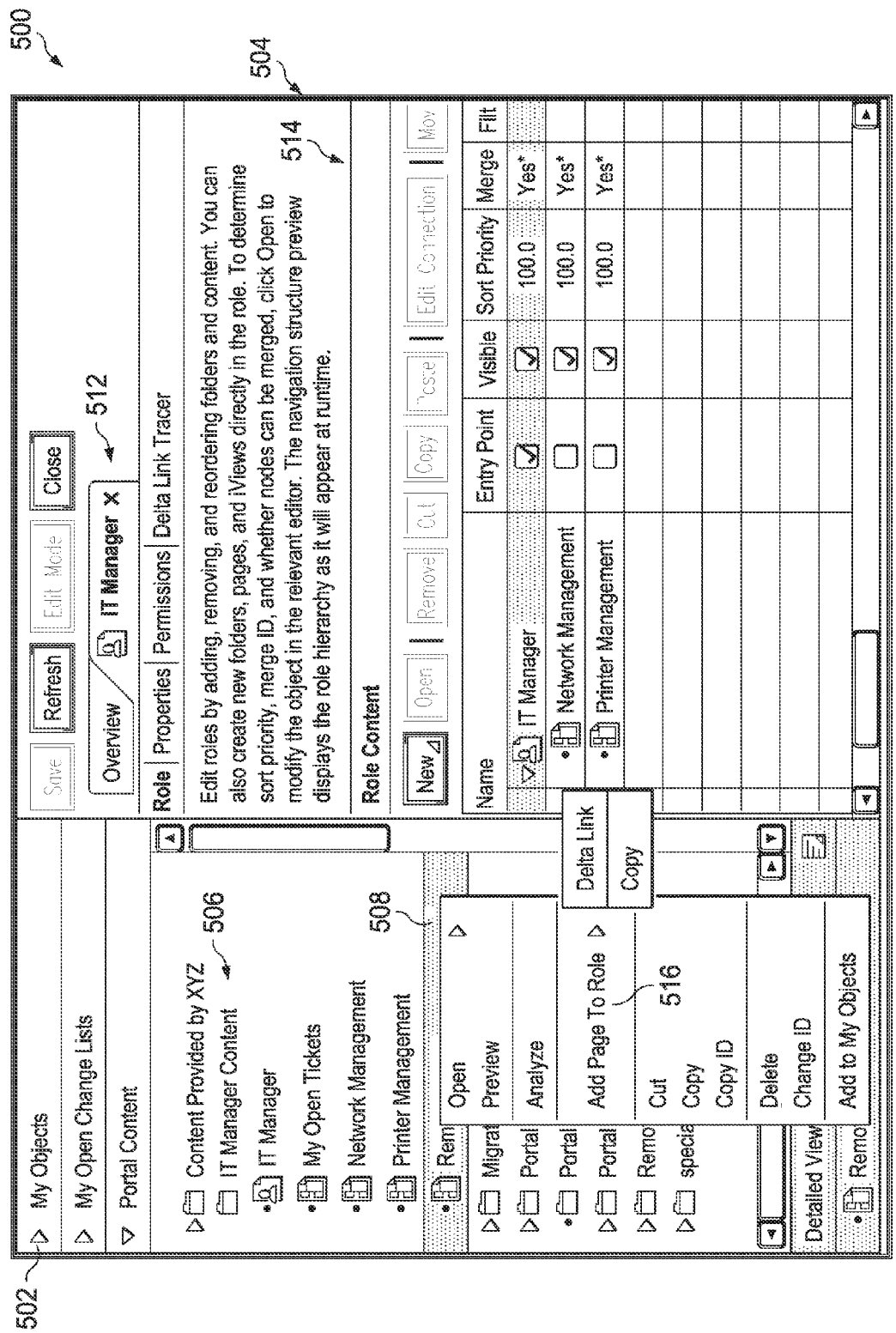
FIGS. 5A-5B illustrate example user interfaces used with managing content to be created for a web portal.
Figure 5B:
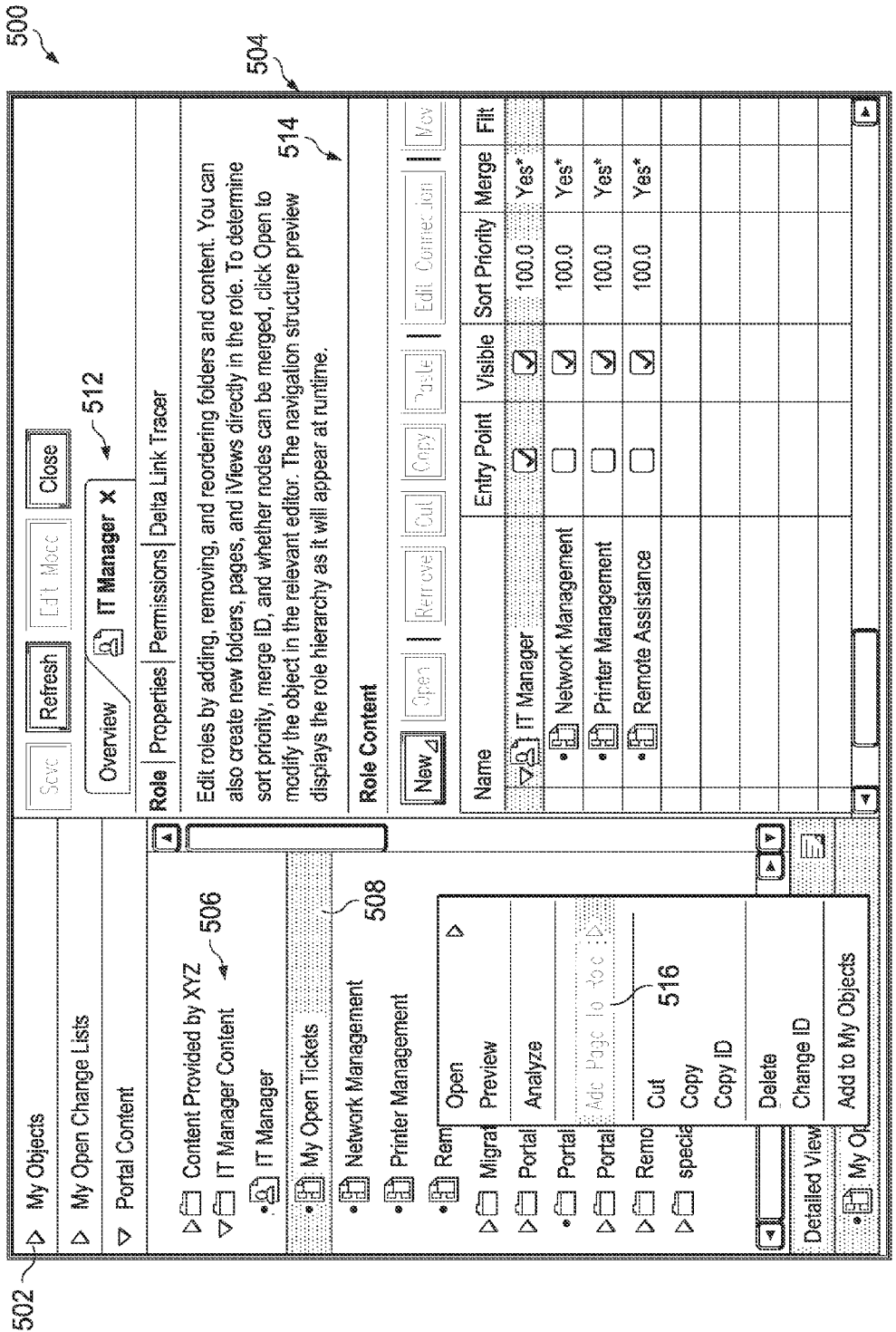

FIGS. 5A-5B illustrate example user interfaces used with managing content to be created for a web portal. Specifically, FIGS. 5A and 5B illustrates a user interface 500 including a folder portion 502 and an editor portion 504. The folder portion 502 includes multiple folders 506 that can include portal (web) content 508 (e.g., portal pages). The editor portion 504 includes a specific role object 512 (analogous to the portal objects 160) (e.g., the "IT Manager" role object 512), and a role content sub-portion 514. The role content sub-portion 514 includes a listing of portal objects 508 contained (included) by the role object 512, including associated properties 516 (such as "entry point;" "visible;" "sort priority;" "merge;" and others).

The administrator can associate (e.g., "create") the portal pages 508 with the role object 512. For example, the administrator can select the "Remote Assistance" portal page 508 to associate with the role object 512. To that end, using the above-mentioned process, it is determined whether the addition of the "Remote Assistance" portal page 508 to the role object 512 will violate the rules 184 or the customizable constraints 186 (e.g., whether the role object 512 will include a number of portal pages greater than a maximum number). In the present example, the role object 512 can be associated with three such portal pages 508. Therefore, when the administrator selects the "Remote Assistance" portal page 508, the GUI 500 includes an option to "Add Page to Role" option 516 via a drop down menu. As shown in FIG. 5B, the role object 512 is now associated with the "Remote Assistance" portal page 508 via the listing of portal object 508 in the role content sub-portion 514.

With continued referenced to FIG. 5B, additionally, the administrator can attempt to associate a further portal page 508 with the role object 512, such as the administrator selecting the "My Open Tickets" portal page 508 to associate with the role object 512. Using the above-mentioned process, it is determined whether the addition of the "My Open Tickets" portal page 508 to the role object 512 will violate the rules 184 or the customizable constraints 186 (e.g., whether the role object 512 will include a number of portal pages greater than a maximum number). In the present example, the role object 512 can be associated with three such portal pages 508. Therefore, when the administrator selects the "My Open Tickets" portal page 508, the GUI 500 does not include an option to "Add Page to Role" option 516 via a drop down menu. Rather, the option to include the Add Page to Role" option 516 via a drop down menu is "greyed out" to indicate such an option is not available.

A number of implementations have been described. Nevertheless, it will be understood that various modifications may be made. For example, other methods described herein besides or in addition to that illustrated in FIG. 1-5 may be performed. Further, the illustrated steps of method 400 and 420 may be performed in different orders, either concurrently or serially. Further, steps may be performed in addition to those illustrated in methods 400 and 420, and some steps illustrated in methods 400 and 420 may be omitted without deviating from the present disclosure. Accordingly, other implementations are within the scope of the following claims.

What is claimed is:

1. A computer-implemented method for managing web content creation, the method comprising:
   receiving, from a host computing system, a portal meta-model comprising one or more rules defining (i) relationships between portal objects of a plurality of portals and (ii) characteristics of the portal objects of the plurality of portals, the one or more rules of the portal meta-model independent of each portal of the plurality of portals, a particular rule of the one or more rules defining that at least one portal object of the plurality of portals contains at least one portal page;
   in response to receiving the portal meta-model, generating a portal model, through a graphical user interface (GUI), as a particular implementation of a particular portal of the plurality of portals, the portal model comprising one or more customizable constraints that are specific to the particular portal and dependent on a business enterprise associated with the particular portal, the customizable constraints on (i) the relationships between the portal objects of the particular portal and (ii) the characteristics of the portal objects of the particular portal, a particular customizable constraint of the customizable constraints defining a threshold number of portal pages contained in the portal objects;
   identifying one or more particular portal objects, of the particular portal, comprising portal content; and
   applying the one or more rules and the one or more customizable constraints to the identified one or more portal objects of the particular portal independent of administrator action to determine that, based on the particular rule, that the identified one or more portal objects contains one or more portal pages, and based on the particular customizable constraint, the identified one or more portal objects include a number of portal pages that meets or exceeds the threshold number of portal pages.

2. The method of claim 1, further comprising:
   determining a difference between at least one characteristic of the one or more particular portal objects and at least one of the rules or the customizable constraints; and
   preparing a notification of the determined difference for display through the GUI.

3. The method of claim 2, further comprising initiating a block of publication of the portal content to a web portal based on the identified difference.

4. The method of claim 2, further comprising:
   identifying a particular one of the rules or customizable constraints that is different from the at least one characteristic of the one or more particular portal objects; and
   adjusting the notification of the determined difference for display through the GUI.

5. The method of claim 1, wherein identifying the one or more particular portal objects comprising portal content comprises receiving an identification of the one or more particular portal objects through a portal editor or wizard.

6. The method of claim 1, wherein at least one of the customizable constraints modifies one of the one or more rules defining relationships between the portal objects of the particular portal, and characteristics of the portal objects of the particular portal.

7. The method of claim 1, wherein the portal model comprises a user-defined portal model, the method further comprising:
   receiving a modification to the user-defined portal model through the GUI, the modification comprising a change to at least one of the customizable constraints.

8. A non-transitory computer storage medium encoded with a computer program, the program comprising instructions that when executed by one or more computers cause the one or more computers to perform operations comprising:
   receiving, from a host computing system, a portal meta-model comprising one or more rules defining (i) relationships between portal objects of a plurality of portals and (ii) characteristics of the portal objects of the plurality of portals, the one or more rules of the portal meta-model independent of each portal of the plurality of portals, a particular rule of the one or more rules defining that at least one portal object of the plurality of portals contains at least one portal page;
   in response to receiving the portal meta-model, generating a portal model, through a graphical user interface (GUI), as a particular implementation of a particular portal of the plurality of portals, the portal model comprising one or more customizable constraints that are specific to the particular portal and dependent on a business enterprise associated with the particular portal, the customizable constraints on (i) the relationships between the portal objects of the particular portal and (ii) the characteristics of the portal objects of the particular portal, a particular customizable constraint of the customizable constraints defining a threshold number of portal pages contained in the portal objects;
   identifying one or more particular portal objects, of the particular portal, comprising portal content; and
   applying the one or more rules and the one or more customizable constraints to the identified one or more portal objects of the particular portal independent of administrator action to determine that, based on the particular rule, that the identified one or more portal objects contains one or more portal pages, and based on the particular customizable constraint, the identified one or more portal objects include a number of portal pages that meets or exceeds the threshold number of portal pages.

9. The non-transitory computer storage medium of claim 8, wherein the operations further comprise:
   determining a difference between at least one characteristic of the one or more particular portal objects and at least one of the rules or the customizable constraints; and
   preparing a notification of the determined difference for display through the GUI.

10. The non-transitory computer storage medium of claim 9, wherein the operations further comprise initiating a block of publication of the portal content to a web portal based on the identified difference.

11. The non-transitory computer storage medium of claim 9, wherein the operations further comprise:
   identifying a particular one of the rules or customizable constraints that is different from the at least one characteristic of the one or more particular portal objects; and
   adjusting the notification of the determined difference for display through the GUI.

12. The non-transitory computer storage medium of claim 8, wherein the operation of identifying the one or more particular portal objects comprising portal content comprises receiving an identification of the one or more particular portal objects through a portal editor or wizard.

13. The non-transitory computer storage medium of claim 8, wherein at least one of the customizable constraints modifies one of the one or more rules defining relationships between the portal objects of the particular portal, and characteristics of the portal objects of the particular portal.

14. The non-transitory computer storage medium of claim 8, wherein the portal model comprises a user-defined portal model, the operations further comprise:
receiving a modification to the user-defined portal model through the GUI, the modification comprising a change to at least one of the customizable constraints.

15. A system of one or more computers configured to perform operations comprising:
receiving, from a host computing system, a portal meta-model comprising one or more rules defining (i) relationships between portal objects of a plurality of portals and (ii) characteristics of the portal objects of the plurality of portals, the one or more rules of the portal meta-model independent of each portal of the plurality of portals, a particular rule of the one or more rules defining that at least one portal object of the plurality of portals contains at least one portal page;
in response to receiving the portal meta-model, generating a portal model, through a graphical user interface (GUI), as a particular implementation of a particular portal of the plurality of portals, the portal model comprising one or more customizable constraints that are specific to the particular portal and dependent on a business enterprise associated with the particular portal, the customizable constraints on (i) the relationships between the portal objects of the particular portal and (ii) the characteristics of the portal objects of the particular portal, a particular customizable constraint of the customizable constraints defining a threshold number of portal pages contained in the portal objects;
identifying one or more particular portal objects, of the particular portal, comprising portal content; and
applying the one or more rules and the one or more customizable constraints to the identified one or more portal objects of the particular portal independent of administrator action to determine that, based on the particular rule, that the identified one or more portal objects contains one or more portal pages, and based on the particular customizable constraint, the identified one or more portal objects include a number of portal pages that meets or exceeds the threshold number of portal pages.

16. The system of claim 15, wherein the operations further comprise:
determining a difference between at least one characteristic of the one or more particular portal objects and at least one of the rules or the customizable constraints; and
preparing a notification of the determined difference for display through the GUI.

17. The system of claim 16, wherein the operations further comprise initiating a block of publication of the portal content to a web portal based on the identified difference.

18. The system of claim 16, wherein the operations further comprise:
identifying a particular one of the rules or customizable constraints that is different from the at least one characteristic of the one or more particular portal objects; and
adjusting the notification of the determined difference for display through the GUI.

19. The system of claim 16, wherein the operation of identifying the one or more particular portal objects comprising portal content comprises receiving an identification of the one or more particular portal objects through a portal editor or wizard.

20. The system of claim 16, wherein at least one of the customizable constraints modifies one of the one or more rules defining relationships between the portal objects of the particular portal, and characteristics of the portal objects of the particular portal.

21. The system of claim 15, wherein the portal model comprises a user-defined portal model, the operations further comprise:
receiving a modification to the user-defined portal model through the GUI, the modification comprising a change to at least one of the customizable constraints.

\* \* \* \* \*